(12) United States Patent
Bazanov

(10) Patent No.: US 8,924,327 B2
(45) Date of Patent: Dec. 30, 2014

(54) METHOD AND APPARATUS FOR PROVIDING RAPPORT MANAGEMENT

(75) Inventor: Peter Valeryevich Bazanov, Moscow (RU)

(73) Assignee: Nokia Corporation, Espoo (FI)

( * ) Notice: Subject to any disclaimer, the term of this patent is extended or adjusted under 35 U.S.C. 154(b) by 238 days.

(21) Appl. No.: 13/536,258

(22) Filed: Jun. 28, 2012

(65) Prior Publication Data
US 2014/0006326 A1 Jan. 2, 2014

(51) Int. Cl.
*G06N 5/00* (2006.01)
*G06N 99/00* (2010.01)

(52) U.S. Cl.
CPC .................................. *G06N 99/005* (2013.01)
USPC .......................................................... 706/45

(58) Field of Classification Search
None
See application file for complete search history.

(56) References Cited

U.S. PATENT DOCUMENTS

| | | | |
|---|---|---|---|
| 7,933,226 B2 * | 4/2011 | Woodruff et al. | ............. 370/260 |
| 2011/0270135 A1 | 11/2011 | Dooley et al. | |
| 2012/0003622 A1 | 1/2012 | Drane et al. | |
| 2012/0206577 A1 * | 8/2012 | Guckenberger et al. | ........ 348/47 |
| 2012/0208592 A1 * | 8/2012 | Davis et al. | ................ 455/556.1 |
| 2012/0232432 A1 * | 9/2012 | Kahn et al. | ..................... 600/595 |
| 2013/0159350 A1 * | 6/2013 | Sankar et al. | .................. 707/784 |

FOREIGN PATENT DOCUMENTS

JP 2010-271536 A 12/2010

* cited by examiner

*Primary Examiner* — Alan Chen
(74) *Attorney, Agent, or Firm* — Ditthavong & Steiner, PC

(57) ABSTRACT

An approach is provided for rapport management. A rapport management platform processes and/or facilitates a processing of coach multimodal sensor information to determine movement information, cognitive information, or a combination thereof, wherein the coach multimodal sensor information is captured from at least one coach device, at least one coach user of the at least one coach device, or a combination thereof while the at least one coach device, the at least one coach user, or a combination thereof is engaged in at least one activity. The rapport management platform is capable of processing and adapting mixed reality objects, changing virtual reality, creating coaching reality based on information, adapting to rendering of reality, reducing and adapting notes and information according to people habits. The rapport management platform is also capable of controlling the quality of mixed reality content transferred in computation clouds, and selecting appropriate CODEC for coaching model transfer.

20 Claims, 10 Drawing Sheets

METHOD AND APPARATUS FOR PROVIDING RAPPORT MANAGEMENT

BACKGROUND

Service providers and device manufacturers (e.g., wireless, cellular, etc.) are continually challenged to deliver value and convenience to consumers by, for example, providing compelling network services and access to various kinds of information. These services collect and produce vast amounts of data that with today's technologies can be managed through numerous, individual and personal information spaces in which persons, groups of persons, services, service providers, etc. can place, share, interact and manipulate (or program devices to automatically perform the planning, interaction and manipulation of) webs of information with their own locally agreed semantics without necessarily conforming to an unobtainable, global whole. Furthermore, in addition to information, the information spaces may be combined with webs of shared and interactive computations or computation spaces so that the devices having connectivity to the computation spaces can have the information in the information space manipulated within the computation space environment and the results delivered to the device, rather than the whole process being performed locally in the device. It is noted that such computation spaces may consist of connectivity between devices, from devices to network infrastructure, to distributed information spaces so that computations can be executed where enough computational elements are available. These combined information spaces and computation spaces often referred to as computation clouds, are extensions of the 'Giant Global Graph' in which one can apply semantics and reasoning at a local level.

The computation clouds can be readily available for access by the service provides to use their data for improving the quality of their services. However, the data collected and/or produced by various services and service providers can be analyzed and processed for the results to be used for providing additional services to the customers in real-time, specifically, services based on coaching models such as lectures, speeches, trainings, etc., can greatly benefit from real-time data and information analysis and exchange of results among parties involved such as, for example, speakers, instructors, sport coaches, and lecturers on one side and students, trainees, and listeners, on the other side.

Some Example Embodiments

Therefore, there is a need for an approach for providing real-time rapport management in order to improve rapport among communicating entities.

According to one embodiment, a method comprises processing and/or facilitating a processing of coach multimodal sensor information to determine movement information, cognitive information, or a combination thereof, wherein the coach multimodal sensor information is captured from at least one coach device, at least one coach user of the at least one coach device, or a combination thereof while the at least one coach device, the at least one coach user, or a combination thereof is engaged in at least one activity. The method also comprises causing, at least in part, a mapping of the movement information, the cognitive information, or a combination thereof to at least one coach model associated with the at least one activity.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of coach multimodal sensor information to determine movement information, cognitive information, or a combination thereof, wherein the coach multimodal sensor information is captured from at least one coach device, at least one coach user of the at least one coach device, or a combination thereof while the at least one coach device, the at least one coach user, or a combination thereof is engaged in at least one activity. The apparatus is also caused to cause, at least in part, a mapping of the movement information, the cognitive information, or a combination thereof to at least one coach model associated with the at least one activity.

According to another embodiment, a computer-readable storage medium carries one or more sequences of one or more instructions which, when executed by one or more processors, cause, at least in part, an apparatus to process and/or facilitate a processing of coach multimodal sensor information to determine movement information, cognitive information, or a combination thereof, wherein the coach multimodal sensor information is captured from at least one coach device, at least one coach user of the at least one coach device, or a combination thereof while the at least one coach device, the at least one coach user, or a combination thereof is engaged in at least one activity. The apparatus is also caused to cause, at least in part, a mapping of the movement information, the cognitive information, or a combination thereof to at least one coach model associated with the at least one activity.

According to another embodiment, an apparatus comprises means for processing and/or facilitating a processing of coach multimodal sensor information to determine movement information, cognitive information, or a combination thereof, wherein the coach multimodal sensor information is captured from at least one coach device, at least one coach user of the at least one coach device, or a combination thereof while the at least one coach device, the at least one coach user, or a combination thereof is engaged in at least one activity. The apparatus also comprises means for causing, at least in part, a mapping of the movement information, the cognitive information, or a combination thereof to at least one coach model associated with the at least one activity.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing real-time rapport management are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
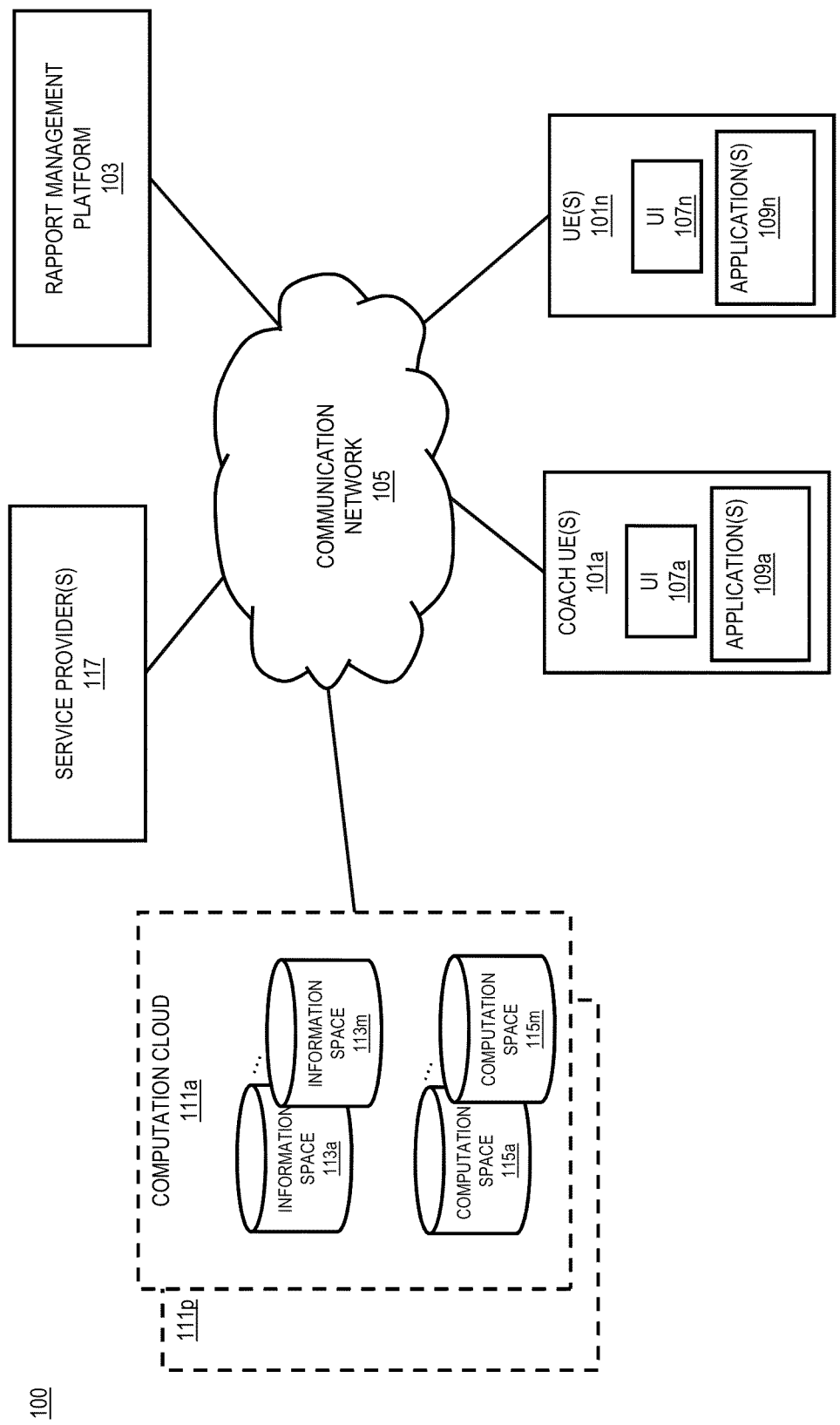
FIG. 1 is a diagram of a system capable of providing real-time rapport management, according to one embodiment.

FIG. 1 is a diagram of a system capable of providing real-time rapport management, according to one embodiment. Various service providers provide communication services to the users of mobile devices, wherein the services transmit and adapt information between the users (e.g., a sender and a receiver). However, for the users who are communicating with each other using the provided services understanding each other's presentations and goals can be an issue. Furthermore, valuable information such as quality of rapport among users, quality of training and teaching (e.g., when communication is between teachers and students) is hard to obtain.

In one embodiment, the information can be presented by users with different educational and cultural backgrounds, language proficiency levels, etc. There are occasions when brief introduction or recap of the past, the future, or both in accordance with a lecture, a meeting, or other communications is needed in real-time. However, metrics establishment for measurement of important information such as level of information transmission, quality of service, level of explanation and rapport, level of immersive effects in the learning process, problem of the audience attention detection, measurement of the audience emotions, measurement of feedbacks, creation of automatic remix of notes about the lecture, measurement of explanation level in the notes, level of proximity and rapport detection with the lecture, detection of the needed psychological filters (for example translation to another language) and channels for the better explanation, can be very hard.

In one embodiment, a lecturer may explain and propose a presentation with large number of terminologies and, as a result, a good quality of rapport can be achieved only by brilliant students who can understand the material and explain information with more details to other students. In this embodiment, in order to determine the quality of rapport for each of the participants, a rapport detection service can be provided. A rapport detection service may determine quality of a rapport based on, for example, interaction between a lecturer and a student.

It is noted that, during a teaching process, the participants (e.g., students) may have different levels of background knowledge and learning capabilities. Some participants may need additional explanation about the lecture material while some other participants may need to be given more advanced material that corresponds well with their level of knowledge. Furthermore, some participants may want to participate in several lectures simultaneously. For example, a Harry Potter scenario, wherein Hermione participates in two lectures simultaneously traveling in time, can be realized by application of tracking of the environment, creation of the remixes of environment, visualization of remix trailers in near eye display of the mixed reality in see-through mode, and adaptation of the media to the participant's current state of cognition.

In various embodiments, multi-dimensional learning material may be transformed into other forms of cognition in order to be better understood by the participants. For example, textual material can be transformed into visual representation. In these embodiments metrics associated with the form of representation are established. It is noted that learning process can be done iteratively through repetition and application of different cognitive filters (e.g., visual, audio, kinesthetic, digital, etc.) For example, a Groundhog Day scenario can be realized in a form of mixed coaching environment with bootstrap procedure wherein errors in coaching activity is corrected by application of new filters.

In one embodiment, during real-time events such as, for example, exams, debates, and negotiations, weighed true/false decisions about various hypotheses regarding participant members may be needed, wherein the weighed decisions can be used for argument measurement and objective decision making based on the statistics of hypothesis measurements.

In one embodiment, a lecturer or speaker may need the capability to see the quality of rapport with audience in real-time. The speaker can use augmented instruments to visualize the timeline of the teaching process with ability to interact with participants in real-time. It is noted that visualization of rapport among event participants, measurement quality of rapport, quality of negotiations and quality of decision making states in a real-time manner is a challenge.

To address the problems described, a system 100 of FIG. 1 introduces the capability to provide real-time rapport management. In one embodiment, a user of user equipment(s) (UE(s)) 101n may send a request to the service provider(s) 117, to obtain a coach model within a certain time frame. The user may also include other information in the request regarding the desired type and quality of the coach model. In addition to the user requirements, the UE 101n may transfer other information to the service provider(s) 117 with regards to the request such as, for example, condition of the communication network 105 (e.g., speed, noise problems), power consumption of the UE(s) 101n, etc.

In one embodiment, the rapport management platform 103 obtains coach material provided by a coach (e.g., a teacher, a lecturer, a trainer, a speaker, an instructor, etc.) via a coach UE 101a and adapts the coach material to the available information including reconfiguration of the quality of coach material according to the user requirements such as the time frame. The coach material may also include information about the coach, requirements associated with the coach, etc. The rapport management platform 103 may create a new remix of the coach material based on the information.

In one embodiment, the rapport management platform 103 may reconfigure the quality of coach material according to the additional information it receives from the coach UE 101a, the UE 101n, or a combination, such as, for example, network issues, power consumption, etc. For example, if the information provided by the coach UE 101a, the UE 101n, or a combination, indicate a congested network, the rapport management platform 103 may compress the remix of coach material (e.g., video compression, audio compression, emotion compression, three dimensional mesh compression, compression of mind maps based on prioritization of the notes, etc.) It is noted that mind mapping is a technique for improving information recording techniques in order to be able to draw useful knowledge from the recorded information such as, notes. Mind maps enable quicker and more structured way for identifying and understanding a subject and its properties. Mind maps show how pieces of information fit together, as well as provide recording of the raw facts contained in normal notes.

In addition, in one embodiment, the rapport management platform 103 may collect information regarding the history of the usage of coach material by the UE 101n. The rapport management platform 103 may reconfigure the quality of coach material according to the history which may represent device and user habits such as, for example, the use of UE 101n, near eye display constraints set by the user, user's preferred form of representation (visual, audio, digital, tangible experience, etc.), etc.

In one embodiment, the rapport management platform 103 may adapt one or more coach fusion algorithms to make a remix of the coach material according to data from multiple sources, including the user request information, the coach information, the additional information from the coach UE 101a and UE 101n, the history information, or a combination thereof. Application of one or more coach fusion algorithms provide techniques that combine data from the multiple sources, as described, for creating the coach model remix. The one or more coach fusion algorithms may provide video scene recognition (selection of the important video sequences, image quality analysis, etc.), audio scene recognition, emotion scene recognition, for example based on electrocardiography data of the user, principal component analysis via each data source, using neural networks for the fusion of data from different sources, or a combination thereof.

In one embodiment, the rapport management platform 103 creates output of remix mind maps, remix vectors, synthesize kernel elements of a three dimensional virtual environment based on remix, or a combination thereof.

In one embodiment, the rapport management platform 103 may transmit the remix of coach material according to the data from multiple sources (e.g., time frame, power, network conditions, speed, noise, etc.)

In one embodiment, the rapport management platform 103 adapts the output remix content to the UE 101n. Furthermore, the type of visualization of the coach is adapted to the user filters (e.g., languages, habits, taste in video, audio, digital form of presentation of the coach, etc.)

In one embodiment, the rapport management platform 103 synthesizes remix of video clips for current time frame parameter identified by a user of UE 101n and visualizes it in one or more near eye displays (e.g., UI 107a, 107n) as an embedded screen in the coach UE 101a and UE 101n, a separate screen, or a combination thereof with brief introduction about past actions in the presentation providing a time machine concept, wherein the user of UE 101n can have access to parts of the presentation he or she may have missed, while following the current presentation simultaneously.

In one embodiment, a near eye display or head mounted display can fully immerse the user in mixed coaching reality, wherein part of the reality is real, and part of the reality is composed of remixes of predicted future or past. For instance, a student that arrives late to the classroom can obtain a remix of the beginning of the lecture in such a way that a classmate can usually describe it to them using a rapport language. Additionally, a brilliant student can obtain remix of the current lecture and make a decision to continue coaching or drop the lecture based on the remix. Such scenarios are realized and controlled by rapport management platform 103 based on the predicted remix of the lecture based on statistics of lectures, predefined augmented reality presentations, level of augmented reality effects, level of orator skills and filters of explanation, notes from students, rapport features between lecturer and audience, etc.

In one embodiment, the rapport management platform 103 transmits special coach model features to the UE 101n, and the user of UE 101n can see current lecture, presentation, etc., provided by the coach UE 101a via the service provider(s) 117, with the ability to obtain useful coach model from the past or the future. Furthermore, the visualizations may be provided based on the history of user habits.

In one embodiment, the rapport management platform 103 may synthesize augmented artifacts of remix objects associated with the coach model in the virtual learning environment for one or more near eye displays to provide a spatial immersion concept for the user of UE 101n. In this embodiment, the rapport management platform 103 transmits special coach model features and augmented objects to the UE 101n, and the user of UE 101n can feel the spatial immersion while using the services provided by the coach UE 101a via service provider(s) 117. Additionally, or alternatively, the rapport management platform 103 may provide the spatial immersion by synthesizing a three dimensional learning environment for the remix of the coach for the one or more near eye displays.

In various embodiments, the rapport management platform 103 provides various utilities such as, for example, the time machine concept, the spatial immersion concept, the augmented reality presentation and diminished reality presentation with multiple psychological filters, the augmented automatic notes writing, mind maps, idea presentations, remix feedback creation about the lecture, fusion of the augmented reality presentation and automatic notes in one extended presentation, reprinting the presentation in multi-channel ways for adaptive cognition, or a combination thereof. Additionally, the rapport management platform 103 can provide extended presentation wherein the user of UE 101n can adjust setting and set special remix for the individual cognition, etc. This can provide better quality of rapport and learning among the service provider(s) 117 and the users of UEs 101n.

In one embodiment, the services (e.g. coaching services, lectures, presentations, etc.) provided by the coach UE 101a via the service provider(s) 117 and managed by the rapport management platform 103 may be provided to the UEs 101n via one or more computation clouds 111a-111p in a distributed manner. The computation clouds 111a-111p make the distribution transparent to the users by providing timely access to the requested services, even in conditions when the requested service is composed of multiple components that may be distributed over a wide spectrum of distributed networks (e.g., the World Wide Web).

In one embodiment, the rapport management platform 103 can simultaneously track features of rapport between one or more coach UEs 101a and one or more users of UEs 101n associated with lectures, negotiations, debates, etc., and visualize the features in real-time. Additionally, the rapport management platform 103 may simultaneously track polygraph features, judge decisions, or a combination thereof, associated with lectures, exams, negotiations, debates, etc.

In one embodiment, the rapport management platform 103 enables users of UEs 101n to experience time machine immersive effects emulation for advanced people communications and learning. The rapport management platform 103 provides information in time that users can easily look through virtual and/or augmented reality presentations through time (past, present, future) in remix mode or other more efficient ways. Furthermore, the rapport management platform 103 enables the users to interact with and change augmented reality information in past, present, and future.

In one embodiment, the rapport management platform 103 provides information in multimodal enhanced view and application of the bootstrap procedure for user education. The rapport management platform 103 may create principal component remix from different multimodal sources. The rapport management platform 103 may also analyze the principal components and perform data mining, information reduction, and clusterization procedures when needed. Furthermore, the rapport management platform 103 may execute visualization procedures for routine operation and, for example, create three dimensional virtual environments based on the remix notes. Another example for a routine operation is avatar modeling of a teacher who performs some kind of routine procedure such as writing on the desk by creating a clone of himself/herself in form of an avatar.

In one embodiment, the rapport management platform 103 may provide compressed remix for users of the UEs 101n for fast training, brief introduction, information for the newcomers, etc. The rapport management platform 103 may provide compressed remix for future by prediction based on the past data.

In one embodiment, the rapport management platform 103 enables the users of UEs 101n to access beginning of the lectures (remix or full version) in own reality in the past, to access the remix or full version of the predicted lecture in own reality in the future, or a combination thereof. It is noted that part of the information can come from past material, parts from present or future adaptively to the user qualifications, requirements, and mode of view.

In one embodiment, the UEs 101n may be equipped with smart training instruments that can use augmented reality objects and artifacts. The rapport management platform 103 can provide services such as, for example, creating effects of far distance zooming, tele-presence, magic communications, karaoke enhancement of the training, metaphor involvement, travel through time, reality, lectures, debates based on data mining products and mind maps, etc., to the UEs 101n via the smart training instruments.

In one embodiment, the rapport management platform 103 may provide coach material to the users of UEs 101n in special formats with transformation of reality into augmented and mixed reality, to model each type of reality in time, or in the environment. The rapport management platform 103 may also reduce the reality, for example, by selecting important people or objects to be presented, create special view of the environment for comparison between past and present, measure user emotions using cognitive UIs 107n, track emotions and responses of users of UEs 101n by changing the reality, show objects and environments in lectures (e.g., micro or macro life level) by using augmented reality objects and interaction between augmented reality and mixed reality, etc.

In one embodiment, the rapport management platform 103 may create smart presentations in extended augmented reality multimodal format. The rapport management platform 103 may use mixed reality objects for enhancing the format of presentation, wherein part of the lecture is represented by real lecturer (a user of a coach UE 101a), and other part by artificial intelligence extracted from internet, old lectures of the same lecturer, brilliant students notes that are able to clarify the complex information for others, frequently asked questions, etc. using data mining methods.

In one embodiment, the rapport management platform 103 may have access to the databases containing the coach material of the user of coach UE 101a (e.g., a professor's past lectures), collective notes from users of UEs 101n (e.g., student notes), and the World Wide Web. Additionally, the rapport management platform 103 may be connected with data mining and search engines, automatic translation tools, etc. The rapport management platform 103 can use these resources for facilitating rapport between the users of coach UEs 101a and UEs 101n.

In one embodiment, the rapport management platform 103 may have the capability of correcting any errors that may occur during the communication according to scales determined, by assigning weights to various parts of the coach material. The rapport management platform 103 may provide magic augmented reality effects in presentations by realizing and combining the augmented reality presentations, augmented reality notes, mind maps, and fusion of the coach and student material.

In one embodiment, the rapport management platform 103 provides various information filters such as, for example, psychological filters, educational filters, emotion recognition filters, automatic translation filters, etc. For example, the rapport management platform 103 may perform psychology and emotion recognition, face recognition, age recognition of the speaker and listeners or lecturer and students, etc. The application of information filters enables the rapport management platform 103 to support rapport between people on trainings, conferences, lectures, etc. It also helps adaptation of material according to different educational, cultural, and psychological levels of speakers, listeners, or a combination thereof. Furthermore, the rapport management platform 103 can represent the filtered material in individual reality for each participant of the communications. For example, educational filters can recognize the age and education background of participants or automatic translation filters can translate material from one language to another, in order to provide an efficient rapport between a presenter (lecturer, professor, trainers, teacher, speaker, therapists, investigators, etc.) and his or her audience (students, trainees, meeting participants, patients, suspects, etc.)

In one embodiment, the rapport management platform 103 can detect participants' attention to the information they are receiving, for example through a speech, and provide rapport recognition and tracking. For example, the rapport management platform 103 may collect real-time auditory opinion about a lecture from students and perform real-time analysis of the collected opinions and utilize the analysis results for modifying the focus of the material presented. Furthermore, the rapport management platform 103 may evaluate the quality of the lecture, for example, by using bootstrap procedure according to various quality metrics, wherein the rapport management platform 103 modifies and adjusts various filters (e.g., psychological filters) and cycles teaching in bootstrap until the desired results is achieved. Additionally, automatic interpretation of the lecture from one language to another (e.g., native language of the audience), face recognition of the audience, and attention recognition of the audience can provide additional metrics that enable the rapport management platform 103 to adjust the presented material to the audience for improving the rapport quality and effectiveness of the presentations.

In one embodiment, the rapport management platform 103 generates augmented reality object puzzles for events such as interactive seminars, games and puzzles. The object puzzles generated by the rapport management platform 103 enable supporting interactive seminars and games with puzzles through time, history, psychology, mathematical logic, etc., for better explanation of dependency of the objects or events through time, importance factor for each event or object, importance of interaction in the past, etc.

In one embodiment, the rapport management platform 103 provides visualization and interaction with people avatar and augmented reality in the past, ability to demonstrate history, participate in history with better immersive effect, understanding historic dependencies and logic, etc. For example, visualization of scientific data and timeline processes such as manufacturing processes in augmented reality can provide insights into timeline dependencies in the processes. Furthermore, visualization of the processes, modeling and constructions enables building tasks and games based on the processes, modeling and constructions, for example by utilizing genetic algorithms oriented for tactical, strategic, spatial, and narrative immersion effects.

In one embodiment, the rapport management platform 103 can provide motivation and plan analysis to the users of UEs 101*n* and coach UEs 101*a*, through time machine effects and interaction with objects. The time machine effects can be used for psychological games for leadership, creativity, intelligence, idea contests, immersive therapy, etc., wherein one or more cognitive UI sensors (not shown) provide different responses in different environments, for example, for creative idea contest.

In one embodiment, the rapport management platform 103 can provide polygraph services by providing the ability of checking errors in quarrels, debates, lectures, etc., estimation of arguments' weights, the ability to perform investigatory experiments, visualization and checking of the process in augmented reality, tracking of persons emotions, speech, and estimation of hypothesis probability (True or False) through time, or a combination thereof.

In one embodiment, the rapport management platform 103 provides capability of automated judgment or decision making such as, for example, decision making on the examination papers regarding students' grades, decision making on highly complicated negotiations and job interviews, decision making in communications based on probability and calculations, advanced measurements of brainstorming ideas and visualizations, etc.

In various embodiments, the features of the rapport management platform 103 such as rapport detection, polygraph, judgments, decision makings, etc. are provided by simultaneous acquisition of signals from the coach UEs 101*a* (senders), and acquisition of the signals from the students UEs 101*n* (receivers), data mining processes, remix creation of the information associated with the coach UEs 101*a*, notes and feedback creation of the information associated with the UEs 101*n*, fusion of multiple information (e.g., multiple feedbacks from users of multiple UEs 101*n*), representation of the information in different modes (e.g., psychological filters, interpretations, etc.), measurement of the remix notes between senders and receivers, proximity estimation, detection of the rapport features in visual, audio, kinesthetic, emotional, etc., digital modes, detection of the emotion correspondence to the presented information, estimation of polygraph features, decision making based on the polygraph features and rapport features, remix creation based on rapport features, or a combination thereof.

In one embodiment, time machine effects are provided with application of augmented artifacts, reality changing, smart trainings, psychology recognition and filtering, automatic remix derivative products, visualization and interaction with augmented artifact products, rapport tracking, polygraph/judge modeling, etc. The rapport management platform 103 performs tracking of events during a lecture, negotiations, training session, speech, etc. The rapport management platform 103 performs data mining from multi sensor streams, detects emotional features and rapport features, and adapts the material according to the psychological features of participants. The time machine effects are used for demonstration of spatial immersion for better learning of the material presented by a user of coach UE 101*a* by the users of UEs 101*n*.

In one embodiment, the rapport management platform 103 creates automatic remix from the video, audio, cognitive sensor signals, and other signals using data mining in an output form such as three dimensional video, mind maps, three dimensional virtual environment modeling, augmented/diminished reality, etc. The rapport management platform 103 may be equipped with encoding/decoding components (CO-DECs) that can control and setup time limit for the remix.

In one embodiment, the rapport management platform 103 may utilize remix and time machine immersive features to reduce large videos in a small remix, estimate proximity between video signal and other signals, synchronize the signals, perform quality estimation, combine emotions with videos (e.g., orator frames recognition, key notes of the lecture, etc.), etc.

In one embodiment, the rapport management platform 103 performs data mining on multiple data that create clustered data (notes remix) from lectures, wherein the data can be represented by mind maps.

In one embodiment, the rapport management platform 103 provides fusion (combination) of all notes from the participants to one for the remix, using weighting scheme for the teacher, brilliant students, or other students. The weights associated with information are adjustable and can setup the needed level of explanation. Furthermore, any user of a coach UE 101a, a UE 101n, or a combination can setup time constraints for remixing of the notes.

In one embodiment, the rapport management platform 103 creates a three dimensional virtual environment according to the remix. The rapport management platform 103 may change the three dimensional environment using immersive effects in a tele-presence mode (e.g. virtual attendance in meetings, lectures, via audio/video technologies) using augmented reality. Furthermore, the rapport management platform 103 may create better learning environment using special immersive effects, by reducing of some objects in the reality.

In one embodiment, the rapport management platform 103 can utilize the time machine effect and generate a see-through mode, in which a user of UE 101n (a student) can simultaneously see more than one set of coach material from multiple coach UEs 101a (a teacher, lecturer, etc.) including lecture and augmented reality that is represented by one or more remixes from past or future. For example, the rapport management platform 103 can create past material using principal components from teacher, brilliant students, or other students that is a fusion of many notes in one. Similarly, future material can be synthesized during the lecture presentation, when extended results would be summary experience from the lecturer and students.

In one embodiment, the rapport management platform 103 provides the presentation with a special format that has a psychological channel to adapt to the participant's material representation. In this embodiment, the rapport management platform 103 performs proximity measurement of psychological channel for the student, for a group of students, for the rapport, understanding, quality of the information transmission between sender (coach UE 101a) and receiver (UE 101n) users, etc. Furthermore, lecturers can record the presentation in three dimensional beforehand and some features can be presented by the rapport management platform 103 in avatar tele-presence mode or clone mode. In addition, teachers or presenters can calibrate their orator skills using attention detection sensor information provided to them via the rapport management platform 103. The rapport management platform 103 can provide a presenter the ability to use real or avatar presentation to achieve maximum rapport impact with audience, for example, to adapt presentation for a special room, environment, or large number of audience members. The rapport management platform 103 can summarize information and signals from the lecturer voice, gestures, and emotions, from the attention tracker devices and presentation material.

In one embodiment, the rapport management platform 103 provides additional channels for mind maps, user notes, and remixes. Each user of UE 101n can semi-automatically create notes about the lectures and share them with other users. The rapport management platform 103 can automatically create fusion of the notes and place mind maps in a uniform format. The rapport management platform 103 also summarizes information from the receiver's (user of UE 101n) voice, gestures, emotions and notes from the UE 101n. Additionally, the rapport management platform 103 can setup adaptive filters based on life logging features and individual psychology via a tracker device on UE 101n, via an external attention detection device that can contribute some mind maps to the notes, or a combination thereof.

In one embodiment, the rapport management platform 103 determines core of the rapport features in augmented multi-channel presentation format with psychological filters and adjustable CODECs for brief introduction in time machine mode.

In one embodiment, the rapport management platform 103 detects rapport between coaches and users based on augmented multi-channel presentation formats. The rapport management platform 103 may utilize various information for rapport detection. For example, in one embodiment, the rapport management platform 103 may use two or three dimensional videos, voices, emotion signals from the coach UE 101a (e.g., a lecturer), from the UEs 101n (e.g., students, brilliant students, etc.), from the artificial intelligence, robots, web, social networks, etc. or a combination thereof. Additionally, the rapport management platform 103 may use one or more augmented reality channels via the coach UE 101a (e.g., a virtual lecturer that is a prepared multi-channel presentation with augmented objects that are adaptive to the user and speaker emotions).

In various embodiments, the rapport management platform 103 transmits the information (e.g., learning material) and signals to the multi-channel presentation from the side of coach UE 101a (e.g., the lecturer), transmits the information (feedback material, notes, explanations, mind maps) and signals to the multi-channel presentation from the side of UE 101n (e.g., students, brilliant students), or a combination thereof.

In one embodiment, the rapport management platform 103 provides data mining from the information of the major notes and mind maps, filtration of the information, major notes, and mind maps using setting for multiple and individual users (e.g., psychological filters, educational and cultural filters, emotion filters, interpreter filters, object filters, people filters, etc.). It is noted that filtering may be performed based on computer vision and data mining processes.

In one embodiment, the rapport management platform 103 provides visualizations of augmented and/or diminished reality based on near eye displays, projection devices, TV screen, or a combination thereof, psychology and emotion recognition based on signals for the participants, adaptive filter selection for augmented and diminished reality, presentation format morphing according to the psychological filters, merging of mind maps and notes, recognition of the rapport features between both sides of communications, or a combination thereof.

In one embodiment, the rapport management platform 103 utilizes various metrics for determining rapport features such as, for example, face detection for the audience as attention detector, smile detection for the audience as attention detector, emotion detection for the audience as attention detector, etc.

In one embodiment, the rapport management platform 103 provides the multi-channel format of presentation with augmentation objects and mapping of the user emotions using different multiple designs for the best impact and rapport with each participant (e.g., visual, audio, kinesthetic, digital, etc.), multiple filters for the best impact quality of service (e.g., interpreter, common cultural language, common educational language, etc.) using vocabulary and special terminology, multiple filters oriented for the user emotions and excitement, reduced reality filters that construct principal components from the transmitted information, or a combination thereof.

In one embodiment, the rapport management platform 103 provides the multi-channel format of presentation with compressed remix of the past, that is the product of the data mining product (for example principal fragments of the speech in video content). For example, a student who arrives late at a lecture can see augmented remix about the elapsed part of the lecture missed using near eye display and receive major information and explanation from the beginning of the lecture. A lecturer can prepare multi-channel enhanced format of presentation with avatars, based on history of video lectures, and a student can easily see a remix for the future of the lecture.

Additionally, a lecturer can use the avatar mode to model himself for the routine operations such as drawing of formulas, or interactive explanations of some features in a clone mode. Furthermore, this feature enables brilliant students to participate in multiple lectures at once using an augmented tele-presence system with brief introduction about the past and future of each presentation.

In various embodiment, the rapport management platform 103 can provide the multi-channel format of presentation with spatial immersion modeling service, wherein visualizations of the multi-channel format of presentation can be done by changing of reality for the best learning effect, spatial immersion effect with time machine effects of the environment; with attention detector service that measures the presentation quality of the lecturer and listeners, the quality of understanding of the information based on the proximity of the data mined features, signals, wherein measurement of attention, emotions, and feedback is done for the listeners and measurement of orator skills is done for the speaker; with augmented smart training instruments and augmented reality objects, wherein the smart instruments are intended for the more advanced human and computer interaction; with psychological effects like motivation and plans visualization in augmented reality; with bootstrap procedure, wherein the learning material is represented by number of filters, quality of the learning is measured, misunderstanding material is detected, and filter is incrementally changing for the misunderstanding material presented; with measurement of polygraph features, wherein one can see the weakest slide of presentations, strongest slide of presentations, measure possible true false on questions, etc.; with the measurement of judge decision making features. Using this service leader can gather ideas from the audience, estimated the level of confidence for the idea, and solve the question or puzzle objectively; with remix of combined information of the lecturer and students, summary about the lecture (teacher presentation and notes), remix based on judgment process; with synthesis and visualization of the three dimensional environment based on the summary remix; or a combination thereof.

As shown in FIG. 1, the system 100 comprises a user equipment (UEs) 101a-101n having connectivity to rapport management platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101a-101n are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101a-101n can support any type of interface to the user (such as "wearable" circuitry, etc.).

By way of example, the UEs 101a-101n, the rapport management platform 103, the computation clouds 111a-111p, and the service provider(s) 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
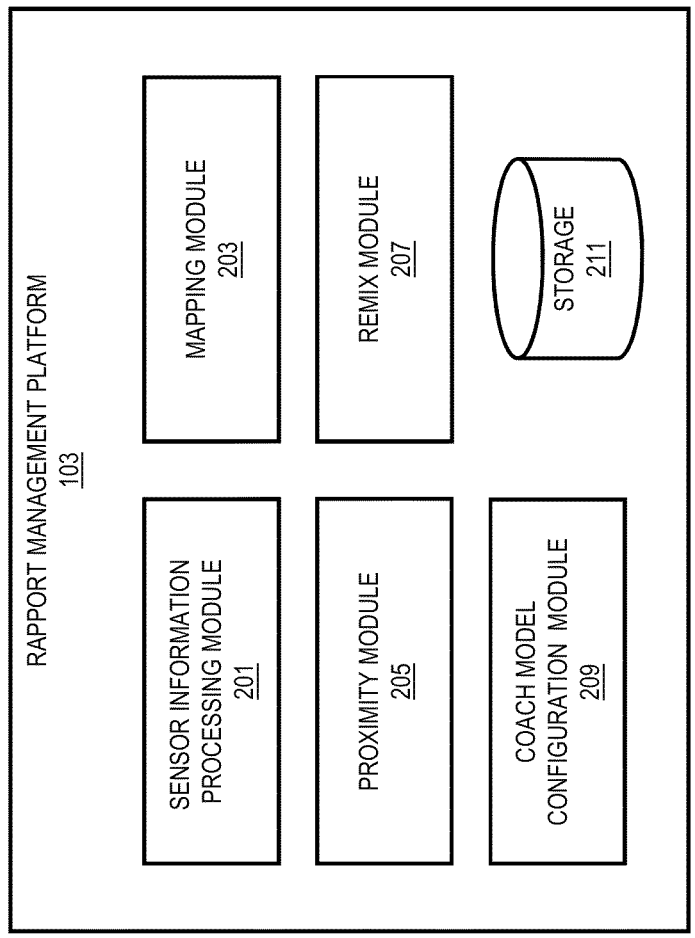
FIG. 2 is a diagram of the components of rapport management platform, according to one embodiment.

FIG. 2 is a diagram of the components of a rapport management platform, according to one embodiment. By way of example, the rapport management platform 103 includes one or more components for providing real-time rapport management. It is contemplated that the functions of these components may be combined in one or more components or performed by other components of equivalent functionality. In this embodiment, the rapport management platform 103 includes a sensor information processing module 201, a mapping module 203, a proximity module 205, a remix module 207, a coach model configuration module 209, and a storage 211.

Figure 3:
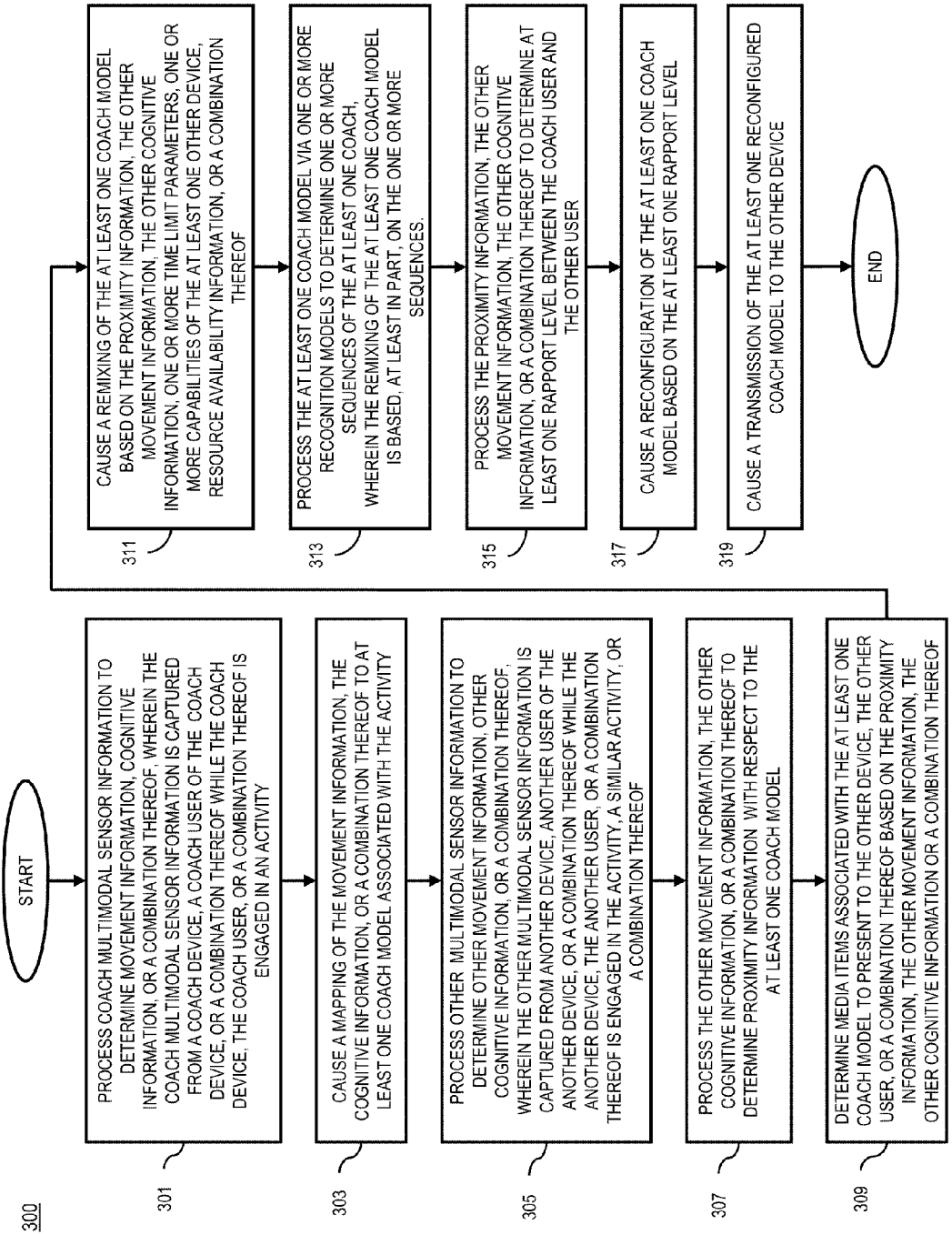
FIG. 3 is a flowchart of a process for providing real-time rapport management, according to one embodiment.
Figure 9:
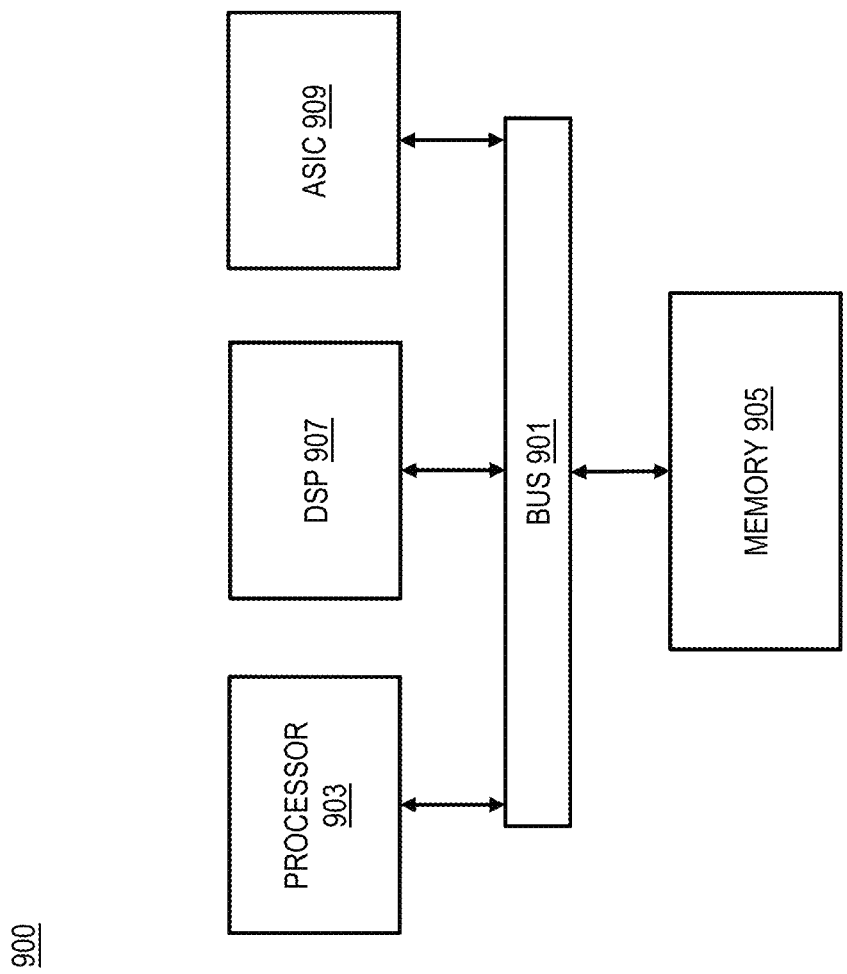
FIG. 9 is a diagram of a chip set that can be used to implement an embodiment of the invention.

FIG. 2 is described with reference to FIG. 3, wherein FIG. 3 is a flowchart of a process for providing real-time rapport management, according to one embodiment. In one embodiment, the rapport management platform 103 performs the process 300 and is implemented in, for instance, a chip set including a processor and a memory as shown in FIG. 9.

In one embodiment, per step 301 of flow chart 300, the sensor information processing module 201 processes coach multimodal sensor information to determine movement information, cognitive information, or a combination thereof, wherein the coach multimodal sensor information is captured from at least one coach UE 101a, at least one coach user of the at least one coach UE 101a (e.g., a lecturer, a teacher, a speaker, an instructor, etc.), or a combination thereof while the at least one coach UE 101a, the at least one coach user, or a combination thereof is engaged in at least one activity. The multimodal sensor information may include psychological information, environmental information, video, audio, image, cognitive signals, etc., or a combination thereof. The activity may be a discussion session, a lecture, a speech, a training session, a meeting, etc.

In one embodiment, per step 303 of FIG. 3, the mapping module 203 causes, at least in part, a mapping of the movement information, the cognitive information, or a combination thereof to at least one coach model associated with the at least one activity. The mapped coach model may be stored via computation cloud 111a-111p, in storage 211, at facilities associated with the service provider 117, or a combination thereof.

In one embodiment, per step 305 of FIG. 3, the sensor information processing module 201 processes other multimodal sensor information to determine other movement information, other cognitive information, or a combination thereof, wherein the other multimodal sensor information is captured from at least one other UE 101n, at least one other user of the at least other UE 101n (e.g., a student, a participant, an audience member, etc.), or a combination thereof while the at least one other UE 101n, the at least one other user, or a combination thereof is engaged in the at least one activity, at least one similar activity, or a combination thereof.

In one embodiment, per step 307 of FIG. 3, the proximity module 205 processes the other movement information, the other cognitive information, or a combination thereof to determine proximity information with respect to the at least one coach model. The proximity information may include proximity between movement and/or cognitive patterns in the coach model versus the performance of the use of UE 101n.

In one embodiment, per step 309 of FIG. 3, the proximity module 205 determines one or more media items associated with the at least one coach model to present to the at least one other UE 101n, the at least one other user, or a combination thereof based, at least in part, on the proximity information, the other movement information, the other cognitive information or a combination thereof. The one or more media items relate, at least in part, to one or more past states, one or more current states, one or more future states, or a combination thereof of the at least one activity, allowing a user of the other UE 101n to fast forward or rewind a live activity, see alternate views related to the activity or a combination thereof.

In one embodiment, per step 311 of FIG. 3, the remix module 207 causes, at least in part, a remixing of the at least one coach model based, at least in part, on the proximity information, the other movement information, the other cognitive information, one or more time limit parameters, one or more capabilities of the at least one other UE 101n, resource availability information, or a combination thereof.

In one embodiment, per step 313 of FIG. 3, the remix module 207 processes the at least one coach model via one or more recognition models to determine one or more sequences of the at least one coach, wherein the remixing of the at least one coach model is based, at least in part, on the one or more sequences.

In one embodiment, per step 315 of FIG. 3, the coach model configuration module 209 processes the proximity information, the other movement information, the other cognitive information, or a combination thereof to determine at least one rapport level between the at least one coach user and the at least one other user.

In one embodiment, per step 317 of FIG. 3, the coach model configuration module 209 causes, at least in part, a reconfiguration of the at least one coach model based, at least in part, on the at least one rapport level. Subsequently, per step 319 of FIG. 3, the coach model configuration module 209 also causes, at least in part, a transmission of the at least one reconfigured coach model to the at least one other UE 101n.

In one embodiment, the reconfiguration of the at least one coach model includes, at least in part, a modification of (a) one or more coaching styles, (b) one or more media types, (c) one or more output systems, or (d) a combination thereof, wherein the output system is one or more devices or screens via which the media or coach model is presented to the user of the other UE 101n such as, for example a near eye display.

In one embodiment, rendering of the at least one coach model at the least one other UE 101n is based, at least in part, on one or more filters associated with the at least one other UE 101n such as, for example, psychological, educational, cultural, emotion, interpretation, object, people, and reduced reality filters or a combination thereof (e.g., multiple filters).

Figure 4:
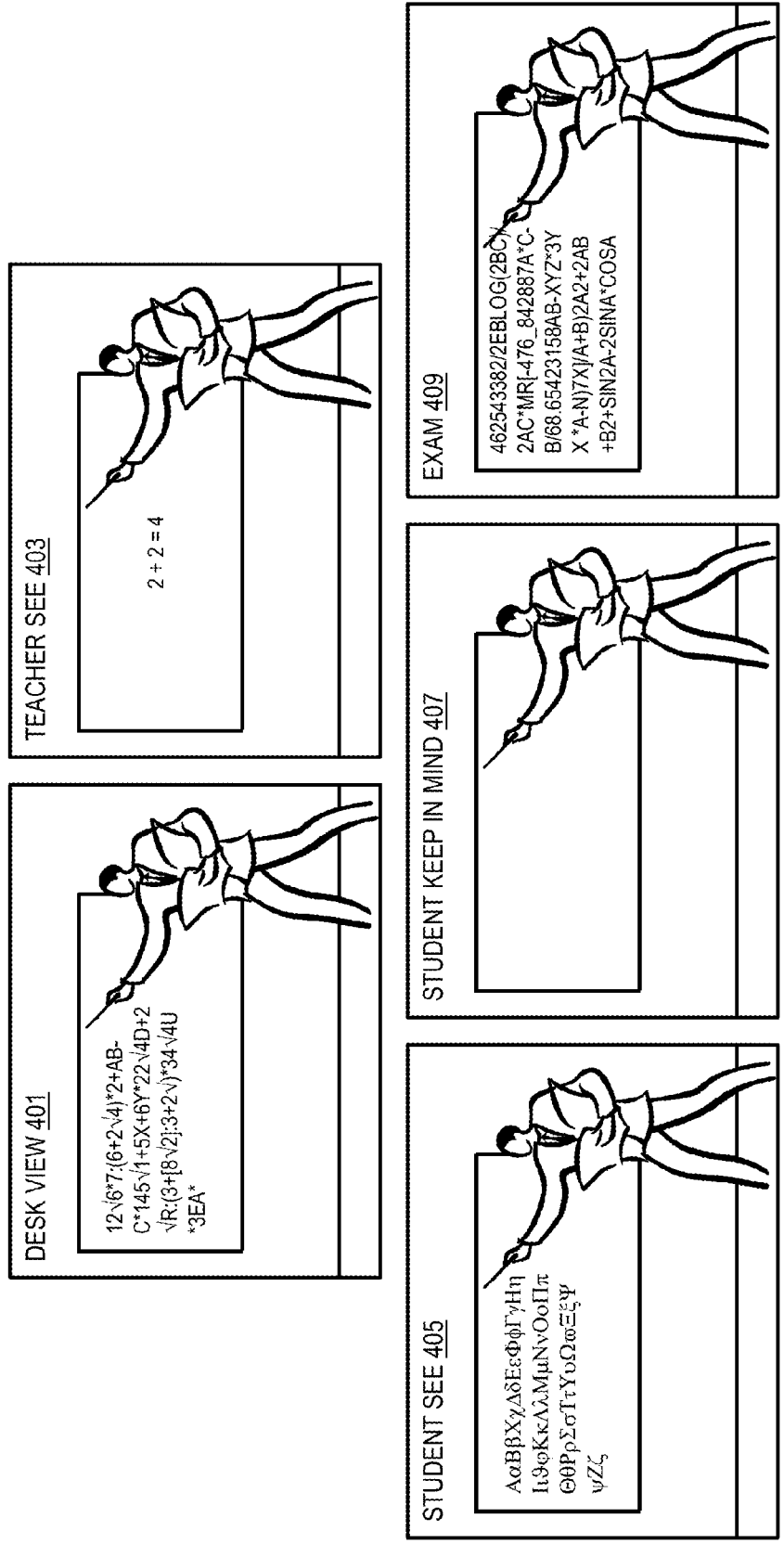
FIG. 4 is a diagram of rapport problem between a presenter and the audience, according to one embodiment.

FIG. 4 is a diagram of rapport problem between a presenter and the audience, according to one embodiment. In one embodiment, the displays 401, 403, 405, 407, and 409 represent various concepts perceived from a presentation by different entities involved in the communication. Rapport metric is a quality of rapport among a group of people, wherein the two or more people feel in sync or on the same wavelength because they feel alike about the information that is being exchanged. The example of FIG. 4 shows a problem in the rapport wherein neither of a desk display 401, a teacher display 403, a student display 405, a student mind 407 and an examination display 409 are in sync with regards to the information they perceive from the communication, since all the displays represent different information contents.

Figure 5:
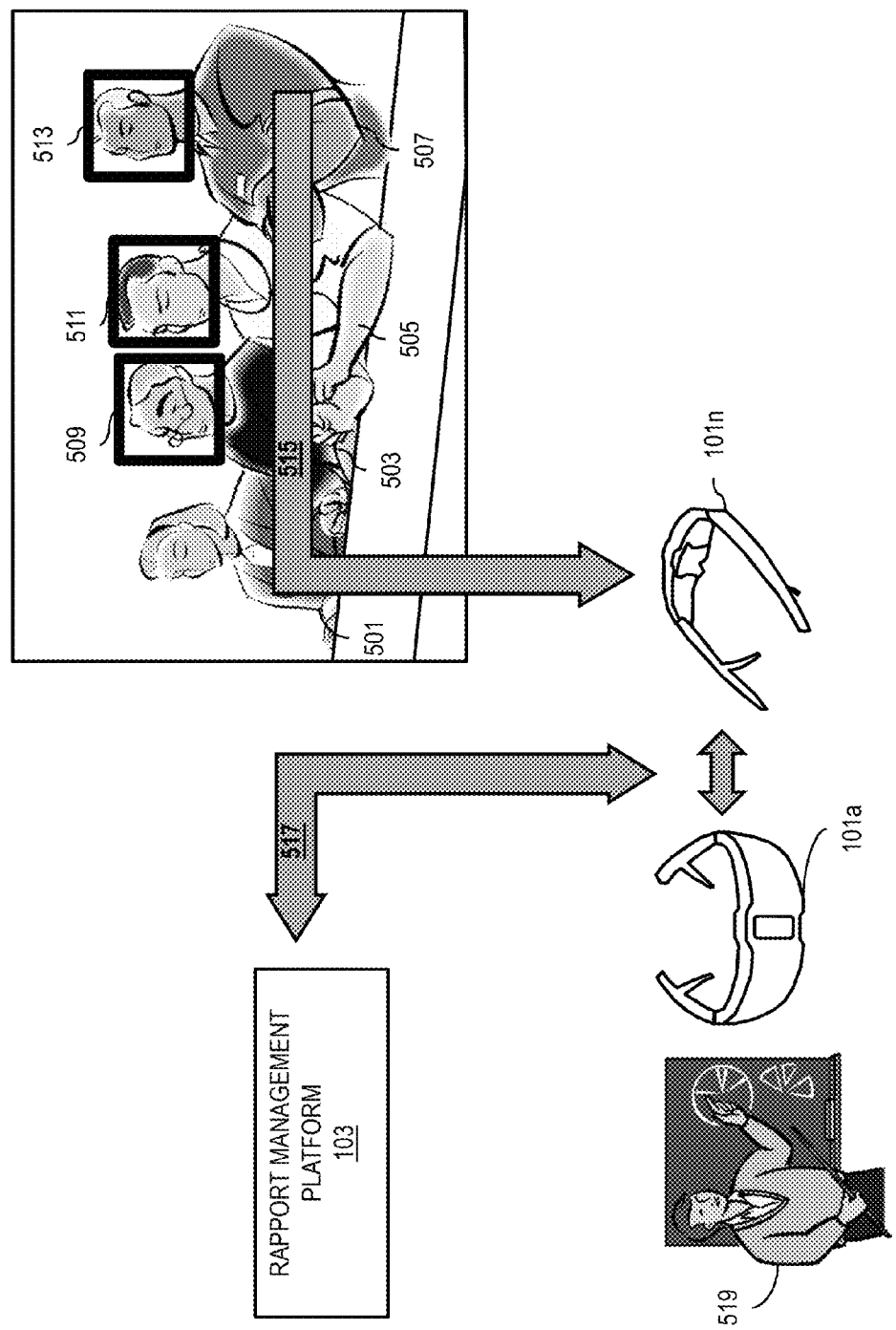
FIG. 5 is a diagram of rapport enhancement, according to various embodiments.

FIG. 5 is a diagram of rapport enhancement, according to various embodiments. In one embodiment, the coach UE 101a, the UE 101n, or a combination, collect sensor data from users 501, 503, 505, and 507 who may be audiences, students, etc. in a presentation by the coach user 519 (e.g., a teacher, lecturer, speaker, etc.). The sensor data collected from users 501-507 (shown by arrow 515) may include face detection, facial expression detection, eye contact detection, etc. and can be used by the rapport management platform 103 as metrics for attention measurement, user satisfaction evaluation, etc.

In one embodiment, the face detection sensor data may indicate users' 501-507 attention based, for example, on their eye contact with the coach user 519 (with the coach UE 101a). Furthermore, the sensor data from within frames 509, 511, and 513 can indicate whether the users 503-507 are looking at the coach user or looking down at their desks. (e.g., reading, checking their cell phones, etc.) This data can be used as metrics for measurement of audience attention by the rapport management platform 103. For example, a complete face image and eye contact by a member of the audience may be interpreted by the rapport management platform 103 as a 100% attention, while a half profile, as seen in audiences 503-507 may be interpreted as 50% attention.

In one embodiment, the rapport management platform 103 may alert the coach user 519, via the coach UE 101a, that the audiences seem to be distracted or dissatisfied with the presentation and suggest actions that the coach user 519 may take in order to attract users' attention and interest.

In one embodiment, a user 501 may have joined the session halfway through the presentation and may be interested in receiving a brief summary of the first half of the presentation that she missed using a recording of the presentation, while following the current part of the presentation in real-time. Alternatively, the user may want to attend two presentations simultaneously. In this embodiment, the user 501 may receive a summary of the first half of the presentation or from another simultaneous presentation from the rapport management platform 103 via her UE 101n.

In various embodiments, the users 501-507 and the coach user 519 may receive various information from the rapport management platform 103 via their UEs 101n or 101a such as, for example, lecture text, magic effects in augmented reality (zooming of the participants, tracking, etc.), feedback from the audience, level of rapport with the audience (e.g., rapport tracking in real-time), scientific visualization of the lecture content in augmented reality, reduced reality, etc.

In other embodiments, the rapport management platform 103 may provide highly immersive augmented reality stream to the users such as, for example, enhanced multimodal format of lectures; analysis and filtering of the stream (e.g., psychological, interpretation, educational, cultural, emotional, etc.); time machine effects (remix introduction about past and future); tele-presence; clone avatar mode; interactive seminars and games with puzzles; motivation and plans visualization; polygraphs for interviews, exams, negotiations, investigations, etc.; automatic decision making; real-time judgment in debates and seminars, etc.; or a combination thereof.

In one embodiment, the rapport management platform 103 enables a user 501-507 to interact with provided avatars in a three dimensional world in the past. The user may combine past and present realities in interaction with one or more coach users 519.

In one embodiment, a user 501-507 may find an unknown notion in the lecture material (e.g., a notion that was explained before the user joined the session). The user may send query to the rapport management platform 103 for information about the notion. In response, the rapport management platform 103 can reconstruct an answer based on the past history via a lecture model, a brilliant student model, a list of frequently asked questions, etc. with explanation of the notion in brief mode with a special reality. The user may scroll on the screen (for example by eyes movement in a near eye display) to the place where the explanation is displayed and retrieve information about nearest past. If the explanation is not sufficient, the user may request for the nearest past reality to see a full explanations, demonstrations, etc.

In one embodiment, the rapport management platform 103 may provide interactive seminars with puzzles through time (history, psychology, math logic, etc.) For example, a coach user 519 may provide training process to users 501-507 as a puzzle, psychological training, visualization of the timeline process, modeling complex architecture visualization of some sequence of reality. The users 510-507 can understand the puzzle by uncovering the timeline correlation. In case they are right they can change something in the past and model the situation in next time.

In one embodiment, the coach user 519 can zoom each user 510-507 even in large auditory from the far places and perform face recognition managed by the rapport management platform 103. The coach UE 101a can track the quality level of auditory, its level of presentation and contact with auditory.

In one embodiment, the rapport management platform 103 can enhance the format of presentation, when part of the lecture comes from the current ongoing lecture in real-time and part is augmented automatically to demonstrate efficiency.

In one embodiment, the rapport management platform 103 can switch to psychological sub-modalities mode, filters, reduced reality (only selected important facts are presented), etc. or represent magic augmented reality effects with artifacts.

In one embodiment, the rapport management platform 103 enables rapid learners (e.g., brilliant students) to evaluate all relevant information from one lecture by prediction of the lecture and switch to a second more interesting lecture. On the other hand, the rapport management platform 103 creates a clone of the lecture and provide some routine work in augmented reality as if the clone is writing on the board, another clone may provide audio. Additionally, users 501-507 may be enabled to model their future and motivate themselves using special reality construction.

Figure 6:
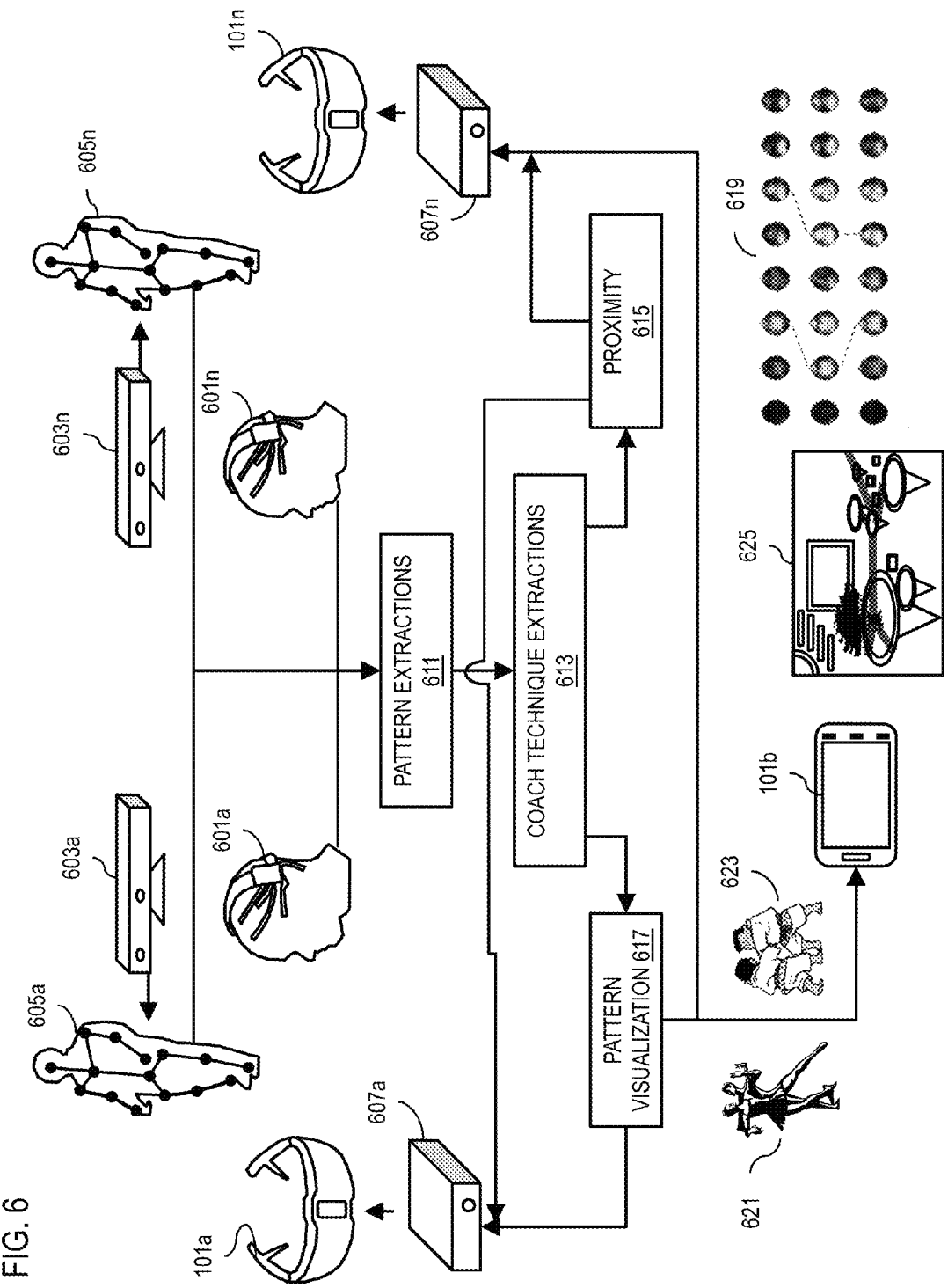
FIG. 6 is a diagram of using coach model in sport networks, according to one embodiment.

FIG. 6 is a diagram of using coach model in sport networks, according to one embodiment. In one embodiment, the rapport management platform 103 uses body movements and emotional understanding in teaching sports and intelligent avatar modeling.

Typically, physical and mental exercises in sports such as karate, dance, yoga etc. are quite fuzzy formalized experiences for people to share. Sport coaching between a master 601a and a student 601n can be a very complicated communication. In one embodiment, the rapport management platform 103 can provide assistance for the master 610a and the student 601n to make progress in teaching/learning the techniques, to uncover hidden patterns in master movements, provide new instruments for sport coaching, describe proximity between the patterns and explore conditions for providing a good training environment.

It is noted that, one of the problems in combat sports or dancing is how to teach and explain the basic elements of the sport to newcomers. Typically, the newcomers investigate complex schemes of body elements by repeating the master's body movement technique. The investigation utilizes the body elements proximity and attachment of the body elements with their emotional state. In the beginning of sport career newcomer can only capture and make progress on the body movement technique and after many repetitions one can acquire the right mental and emotional state that can be synchronized with movements. In addition, many sport elements and schemes in combat sports, or dancing, involve similar movements but different emotional representation states of the movements. It can be hard, even for experienced sportsmen, to retrain themselves for new techniques. Furthermore, for creative sports, such as dancing, there is also important problem of improvisation. One challenge under such a scenario is determining how a master teaches students to improvise. One of the models that help a sports master is create a plan, algorithm, or map that represents correspondence between emotional states and logically right sequence of body elements. The balance between body movement and right emotional state can differentiates experienced sportsmen from newcomers.

In one embodiment, the rapport management platform 103 enables the masters 601a and the students 601n to understand human body gestures and mental states during the exercise via the UE 101a and UE 101n respectively. User interfaces for formalization of human experience during the exercise can use movement detection devices 603a and 603n (e.g., XBOX Kinect®), cognitive sensors 605a and 605n for detecting body movements, or a combination thereof.

In one embodiment, the rapport management platform 103 formalizes the tracked signals provided by user interfaces 603a or 603n and performs data mining on the patterns during sport/spiritual exercises for the masters 601a and students 601n. The pattern extraction process 611, by the rapport management platform 103 can be described by coach maps, avatar models, avatar coach technique models, coach environments, or a combination thereof, shown as process 613. The pattern extraction process 611 may include analysis of body gestures, body gesture patterns, brain signals (alpha, beta, gamma, delta, and theta), etc.

In one embodiment, the rapport management platform 103 defines the metrics and measurements of the sport/spiritual experience patterns and generates pattern visualization 617 that will be presented to masters 601a and students 601n via receivers 607a and 607n using UEs 101a and 101n. In this embodiment, following receiving the patterns, a user (master or student) can recommend adjustable metrics (e.g., related to body movement features or adjustment of mental states) to the rapport management platform 103. The pattern extraction and recommendation cycle may continue until the users are satisfied with the produced patterns.

In one embodiment, the rapport management platform 103 can compare the masters 601a and the students 601n patterns and automatically measure the proximity information 615 between patterns. The proximity information represents proximity between movements and cognitive patterns in the coach model and the student performance. Similarly, the proximity information will be presented to masters 601a and students 601n via receivers 607a and 607n using UEs 101a and 101n. In this embodiment, following receiving the proximity, a user (master or student) can recommend adjustable metrics to the students via the rapport management platform 103. The pattern extraction and recommendation cycle may continue until the users are satisfied with the produced proximity (e.g. when a student 601n is able to perform the movements as good as the master 601a).

In one embodiment, the rapport management platform 103 performs modeling of sport/spiritual experience patterns using maps (e.g., mind maps 619), avatars (e.g. dance avatar 621, sport avatar 623, etc.), or a combination thereof in a virtual world (e.g., the virtual reality dance hall environment 625), with fine visualizations and modeling of the patterns in a way that is understandable and natural for human eyes. Furthermore, the output may be presented to the users via near eye displays 101a and 101n or any other UE 101b. The mind maps 619 may include maps of the body and emotions states. These maps can be subject of interest for master and students. Masters and students can use these patterns and systems to correct the training conditions and improve training process.

In one embodiment, the rapport management platform 103 can have the capabilities of an expert system providing explanations about the sport/spiritual exercise to the masters 601a and students 601n using maps 619 and avatars 621, 623, and 625 coach models. The rapport management platform 103 can also provide to masters 601a and students 601n quality estimation of the maps, avatars, avatar coach modeling, etc.

In one embodiment, the rapport management platform 103 is capable of modeling avatars, maps in augmented reality using near eye displays 101a and 101n, mobile lenses, pico-projectors, smart social network feedbacks, etc. This new user experience for the masters and students, provide quality estimation of the maps and avatar coach modeling.

In one embodiment, the rapport management platform 103 is capable of modeling collective user experience, in order to provide measurement for multiple students, multiple masters, and multiple teams for sport activity such as, for example, like football, soccer, dancing, yoga, etc.

In one embodiment, the rapport management platform 103 can enable masters and students to create their own mixed reality avatars and environments. This allows people to add life logging, training skills, cultural concepts, sport models, spiritual models, psychological models, etc. to the rapport environment. The masters and students can create their own techniques in sports, spiritual activities, interactive Immersive effects, art, etc. and provide distance learning service by using and sharing them with others.

The processes described herein for providing real-time rapport management may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
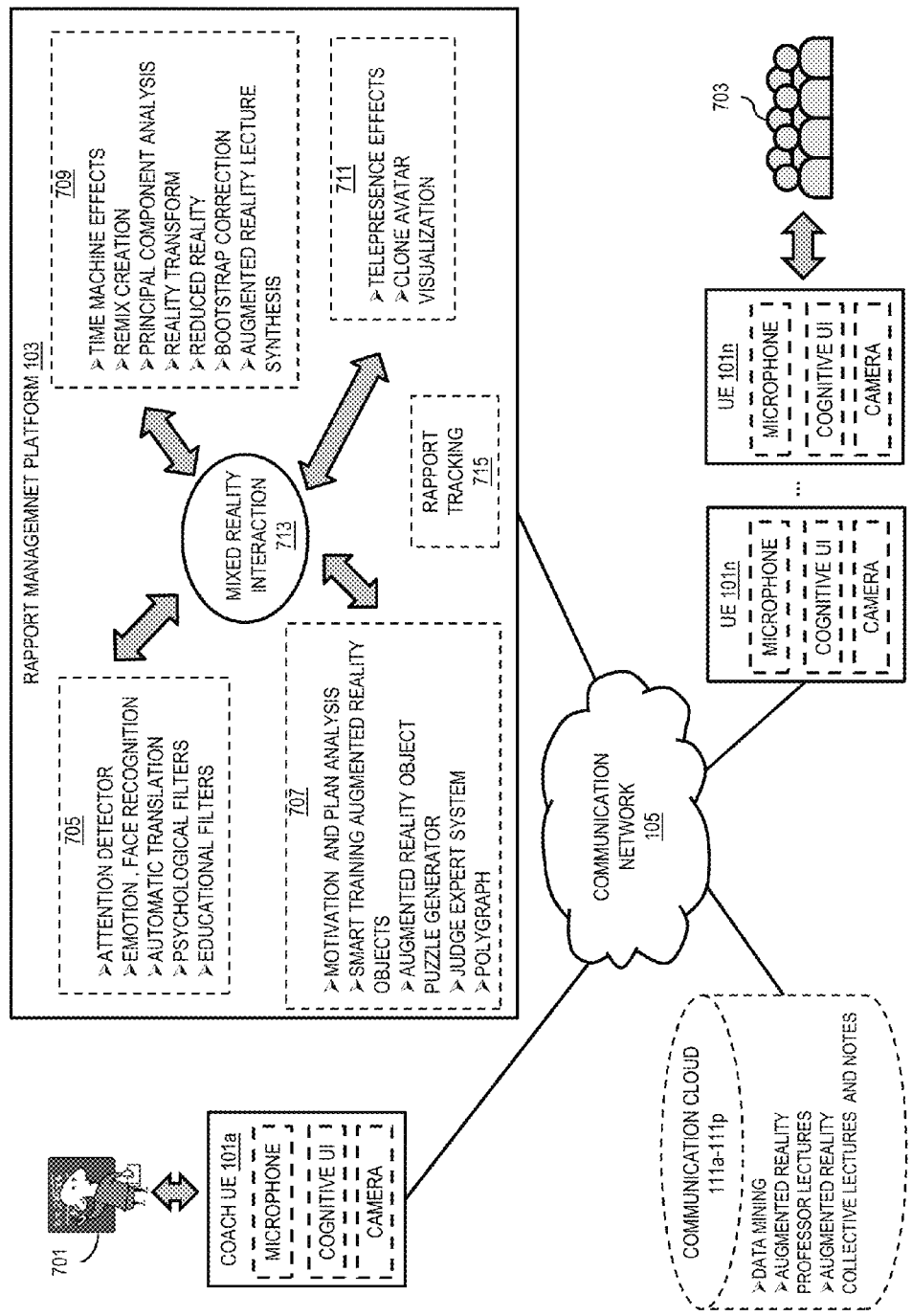
FIG. 7 is a diagram of functions provided by the rapport management platform, according to one embodiment.

FIG. 7 is a diagram of functions provided by the rapport management platform, according to one embodiment. In one embodiment, the rapport management platform 103 performs main function categories shown as blocks 705, 707, 709, and 711, wherein the main categories are linked to each other by mixed reality interaction 713.

In one embodiment, the functions provided by the rapport management platform 103 facilitate communication among a coach 701 (e.g., a teacher, a lecturer, a trainer, a speaker, an instructor, etc.) using one or more coach UEs 101a, and one or more users 703 (e.g., students, trainees, meeting participants, listeners, patients, suspects, etc.) each using one or more UEs

101n, wherein coach UEs 101a and UEs 101n are equipped with microphones, cognitive user interfaces (UIs), cameras, etc. either internally or via external connection.

In one embodiment, the rapport management platform 103 provides the functions to the coach 701 and students 703 via mixed reality interaction 713 composed of the main function categories 705-711. Furthermore, the rapport management platform 103 performs a rapport tracking function 715 monitoring the rapport between coach 701 and users 703

In one embodiment, the function category 709 includes functions such as, for example, spatial immersion and time matching effects, remix creation, principal component analysis, etc. These functions enable the UEs 101n to demonstrate time machine immersive effects emulation for advanced people attention, rapport detection, coaching, communication, learning, etc.

In one embodiment, the function category 709 enables the UEs 101n to represent information to users 703 in time, so that the users can easily look through virtual/augmented reality presentation through time (past, present, and future) in remix mode or other more efficient ways. The function category 709 also enable users 703 to interact with augmented reality information in past, present, and future; and represent information to users 703 in multimodal enhanced view and apply bootstrap procedures for the users' 703 education.

In one embodiment, the remix creation function creates principal component remix from different multimodal sources, wherein the principal component analysis function performs data mining, information reduction, clusterization procedures, etc. Additionally, the rapport management platform 103 provides compressed remix of the communications and fast training to users 703 via compressed remix, brief introduction, information for the newcomers, compressed remix for past and future (e.g., using prediction), ability to see beginning of the lecture (remix or full version) in own reality in the past, ability to see (remix or full version) of the predicted lecture in own reality in the future, or a combination thereof. Furthermore, the information can come partly from past material, from present or future adaptively to the user 703 qualifications and mode of view.

In one embodiment, one or more smart training instruments use augmented reality objects and artifacts. The instruments for advanced smart training use functions such as far distance zooming, tele-presence, magic communications, effects like karaoke enhancement of the training, metaphor involvement, travel through time, reality, lectures, debates based on data mining products, mind maps, etc.

In one embodiment, functions reality transform, reduced reality, and tele-presence from categories 709 and 711 enable the UEs 101n to demonstrate lectures provided by coach 701 in special formats with transform of reality, in augmented and mixed reality, to model each type of reality in time or in environment. Furthermore, the reduced reality function selects users 703 on a specific scene or important objects and creates special view of the environment for comparison between past, present and future.

In one embodiment, the tele-presence function measures user 703 emotions using cognitive UIs, using the capability to track emotions and responses by changing the reality. The augmented reality lecture synthesis may be capable of showing objects and environments in lectures (e.g., micro or macro life levels) by special augmented reality objects, and by interaction between augmented reality and mixed reality.

In one embodiment, the clone avatar visualization function and execution of routine operations can create a three dimensional virtual environment based on the remix notes. The augmented reality lecture synthesis function creates smart presentation in extended augmented reality multimodal format.

In one embodiment, the rapport management platform 103 provides support for enhanced format of presentation using mixed reality objects, wherein part of the lecture is represented by real lecturer 701, part by artificial intelligence such as, for example, by data mining products of the communication cloud 111a-111p using data from the Internet, old lectures of lecturer 701, notes from brilliant students 703, frequently asked questions, search engines, etc. It is noted that databases of professor 701 lectures, collective students 703 notes, etc. can be stored locally on UEs 101a-101n, on computation clouds 111a-111p or on the Internet, provided via communication network 105, or a combination thereof.

In one embodiment, functions such as automatic translation, and bootstrap correction can correct errors according to weighted information from lectures based, at least in part, on concepts of augmented reality presentation, augmented reality notes and mind maps, fusion of the lecture, student material, or a combination thereof.

In one embodiment, the filters in category 705 such as, for example, psychological filters, educational filters, emotion and recognition, automatic translation, etc. provide the ability to perform psychological and emotion recognition, face recognition, age recognition of the speaker and listeners, etc. and the ability to support rapport between people in trainings, conferences, lectures, etc. In this embodiment, the rapport management platform 103 can adapt material according to different educational, cultural, or psychological levels and characteristics of each speaker or every listener. For example, educational filters can recognize the age and education background of participants. The rapport management platform 103 can represent the material in individual reality based, at least in part, on the determined educational, psychological, or cultural background for each participant of the communications. Furthermore, the automatic translation function can translate language of the lecture, speech, etc. from one to another.

In one embodiment, the functions attention detector and rapport tracking 715 provide real-time analysis of auditory opinion of participants about lectures and the participants' estimations from lectures, in order to adjust the focus of the training material, to estimate the quality of the lecturer and the students.

In one embodiment, the bootstrap correction function can provide teaching using one or more bootstrap procedures according to metrics of quality, changing psychological filters, and cycling teaching in bootstrap until the desired results are achieved.

In one embodiment, the rapport management platform 103 enables a lecturer to zoom on a student even in a large auditorium and from a far distance, perform face recognition, and determine the student's attention to the lecture. This determination can provide insights for presenting more engaging material in order to attract the listeners.

In one embodiment, the augmented reality objects puzzle generator function performs tasks such as, for example, interactive seminars, games and puzzles. The support for interactive seminars and games with puzzles can be performed through time based on history, psychology, and mathematical logic for better explanation of dependency of entities or objects through time, importance of interaction in the past, for example by visualization and interaction with people-avatars and augmented reality objects from the past. The capability to demonstrate history, to participate in history with better immersive effects, and to understand historical dependencies and logic provided by the rapport management platform 103 can improve learning process.

In one embodiment, the rapport management platform 103 provides visualization of scientific data and timeline processes (e.g., manufacturing process) in augmented reality, in order to uncover timeline dependencies in one or more processes. Furthermore, tasks and games that are designed based on the concept of genetic algorithms, modeling and construction, and recursive processes can be supported via timeline visualization.

In one embodiment, the time machine effect and interaction with objects, as provided by the rapport management platform 103, can be used for motivation and plan analysis. For example, the time machine effects can be used in psychological games for leadership, creativity, intelligence, and idea contests, and for performing immersive therapy. Additionally, the cognitive UI sensor provides different responses in different environments for creative idea contests.

In one embodiment, the rapport management platform 103 provides polygraph capability to check errors in quarrels, debates, lectures, etc., and to estimate argument weights to be used, for example, in investigatory experiments. The rapport management platform 103 can visualize and test a process in augmented reality, track people's emotions, speech, and estimate probability of various hypotheses (e.g., true or false) through time.

In one embodiment, the judge expert system function in category 707 provides decision making support on exams based, at least in part, on students' grades, on highly complicated negotiations, job interviews, in communications based on probabilities and calculations, etc. The decision making support enables advanced measurements of brainstorming ideas and visualizations.

In one embodiment, the various processes and/or apparatuses described herein are configured as a near eye display with a see-through display mode. By way of example, a see-through display enables a user to view visual representations of information that are overlaid over a scene that may be optically viewed through the display. In addition, examples of a near-eye display include, but are not limited to, head worn displays such as a pair of glasses, goggles, visors, and the like. Other examples of see-through displays may include a windshield, window, transparent board, and/or other optically transparent display surfaces on which information can be presented. The near-eye display, in one embodiment, is capable of presenting the coach model and related information in a mixed reality user interface, a virtual reality interface, and/or any other real/simulated user interface.

In one embodiment, the near-eye display can be coupled or otherwise associated with one or more mounted cameras or other sensors for determining information about a scene or environment depicted in the scene. For example, the camera or sensors may be for capturing life logging information, determining location information, determining a layout of the environment, and other contextual information about the environment. This information, for instance, can then be used by the system 100 to personalize or tailor the various embodiments of the processes described herein. For example, the system 101 may employ sensors to detect proximity to sources of information for coach models, remixes, and/or other related information, and then select the appropriate (e.g., closest) information or model to display.

In another embodiment, the various processes and/or apparatuses described herein are configured as an embedded device. For example, one example of an embedded device is the chip set described below with respect to FIG. 9. Such embedded devices may be contained or included in other devices (e.g., smartphones, wearable devices, etc.) to perform the processes discussed with respect to the various embodiments described herein.

Figure 8:
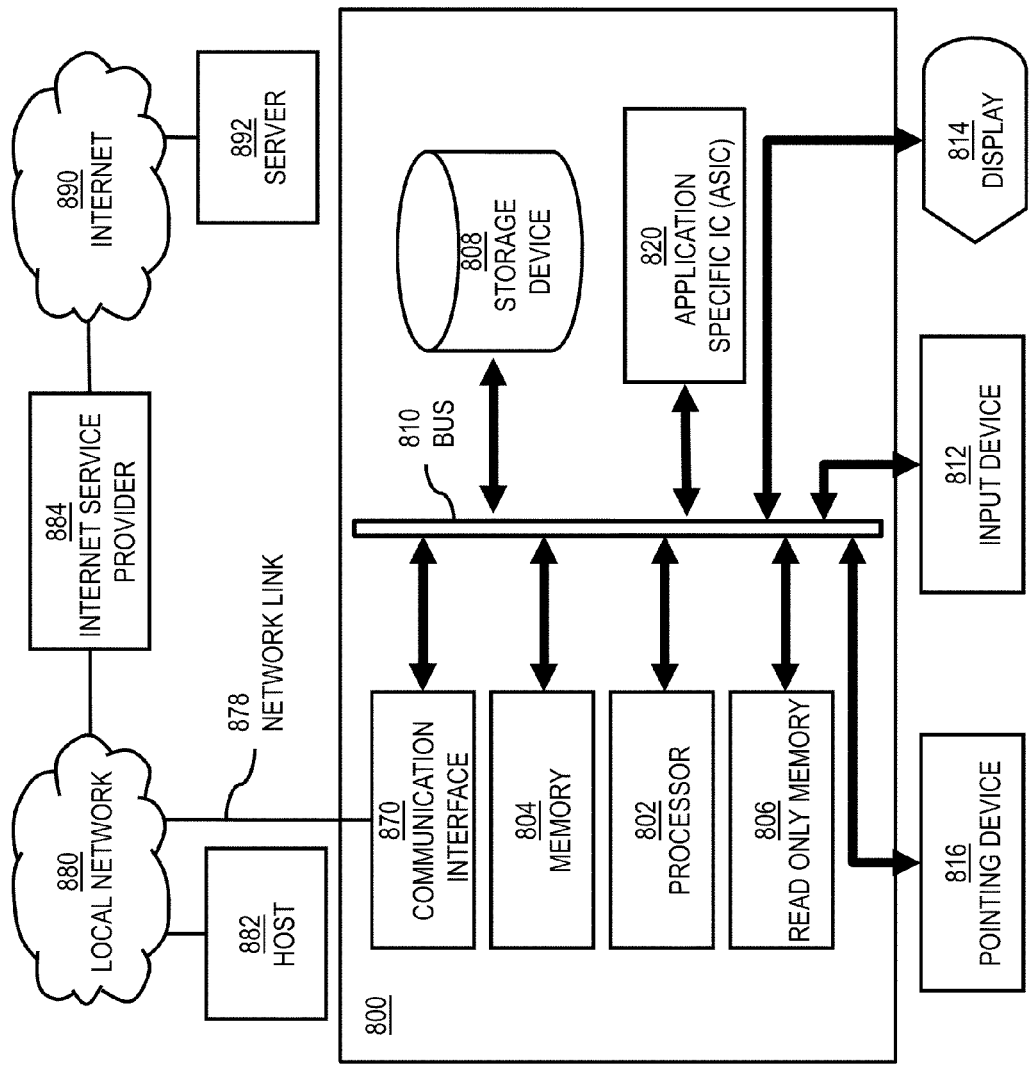
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide real-time rapport management as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing real-time rapport management.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing real-time rapport management. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing real-time rapport management. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing real-time rapport management, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing real-time rapport management to the UEs 101a-101n.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide real-time rapport management as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing real-time rapport management.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real-time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide real-time rapport management. The memory 905 also stores the data associated with or generated by the execution of the inventive steps.

Figure 10:
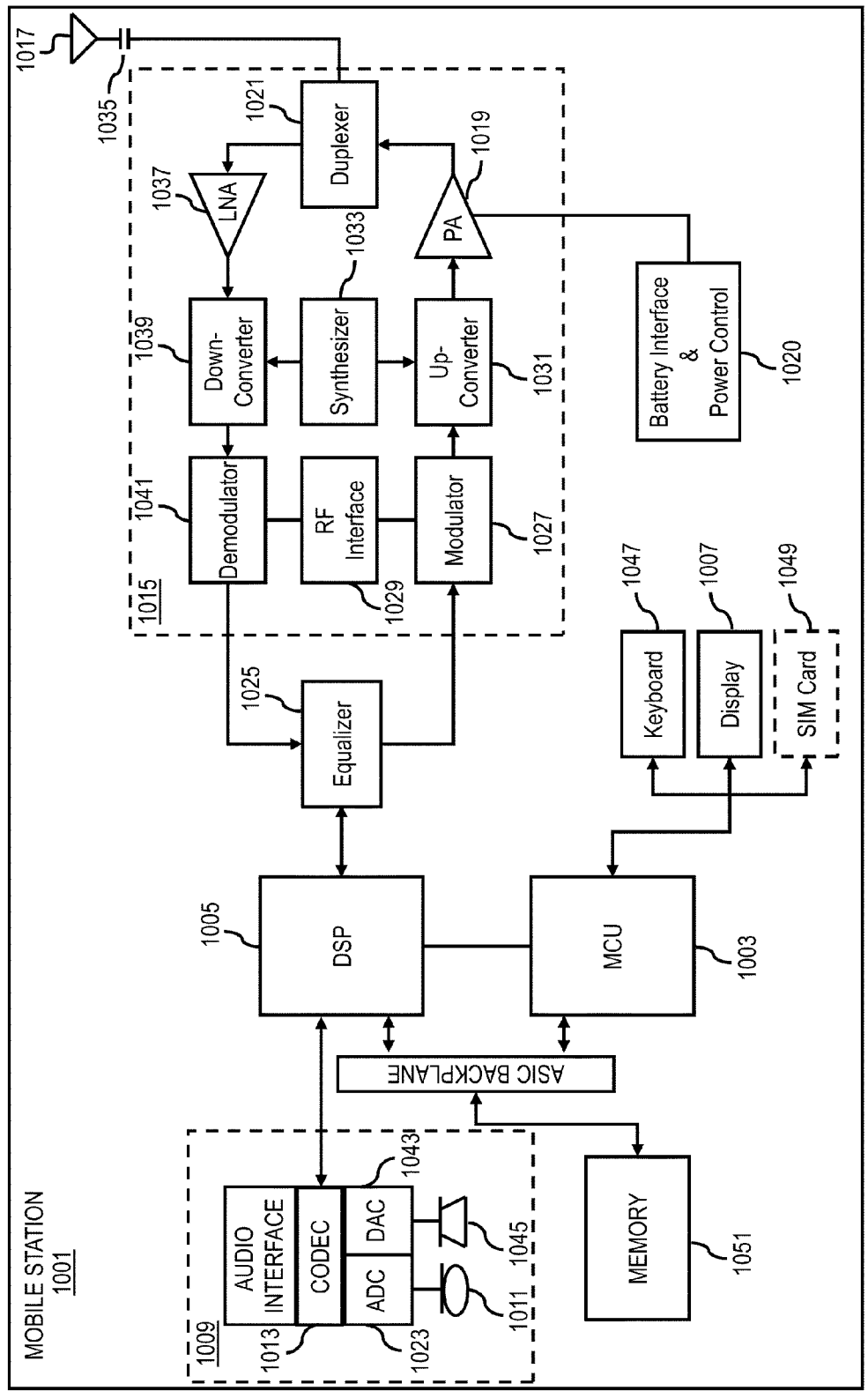
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing real-time rapport management. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing real-time rapport management. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide real-time rapport management. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    a processing of coach multimodal sensor information to determine movement information and cognitive information, wherein the coach multimodal sensor information is captured from at least one coach device, at least one coach user of the at least one coach device, or a combination thereof while the at least one coach device, the at least one coach user, or a combination thereof is engaged in at least one activity; and
    a mapping of the movement information and the cognitive information to at least one coach model associated with the at least one activity.

2. A method of claim 1, wherein the (1) data and/or (2) information and/or (3) at least one signal are further based, at least in part, on the following:
    a processing of other multimodal sensor information to determine other movement information, other cognitive information, or a combination thereof, wherein the other multimodal sensor information is captured from at least one other device, at least one other user of the at least other device, or a combination thereof while the at least one other device, the at least one other user, or a combination thereof is engaged in the at least one activity, at least one similar activity, or a combination thereof.

3. A method of claim 2, wherein the (1) data and/or (2) information and/or (3) at least one signal are further based, at least in part, on the following:
    a processing of the other movement information, the other cognitive information, or a combination thereof to determine proximity information with respect to the at least one coach model; and
    at least one determination of one or more media items associated with the at least one coach model to present to the at least one other device, the at least one other user, or a combination thereof based, at least in part, on the proximity information, the other movement information, the other cognitive information or a combination thereof,
    wherein the one or more media items relate, at least in part, to one or more past states, one or more current states, one or more future states, or a combination thereof of the at least one activity.

4. A method of claim 3, wherein the (1) data and/or (2) information and/or (3) at least one signal are further based, at least in part, on the following:
    a remixing of the at least one coach model based, at least in part, on the proximity information, the other movement information, the other cognitive information, one or more time limit parameters, one or more capabilities of the at least one other device, resource availability information, or a combination thereof.

5. A method of claim 4, wherein the (1) data and/or (2) information and/or (3) at least one signal are further based, at least in part, on the following:
    a processing of the at least one coach model via one or more recognition models to determine one or more sequences of the at least one coach,
    wherein the remixing of the at least one coach model is based, at least in part, on the one or more sequences.

6. A method of claim 2, wherein the (1) data and/or (2) information and/or (3) at least one signal are further based, at least in part, on the following:
    a processing of the proximity information, the other movement information, the other cognitive information, or a combination thereof to determine at least one rapport level between the at least one coach user and the at least one other user.

7. A method of claim 6, wherein the (1) data and/or (2) information and/or (3) at least one signal are further based, at least in part, on the following:
    a reconfiguration of the at least one coach model based, at least in part, on the at least one rapport level; and
    a transmission of the at least one reconfigured coach model to the at least one other device,
    wherein the reconfiguration includes, at least in part, a modification of (a) one or more coaching styles, (b) one or more media types, (c) one or more output systems, or (d) a combination thereof.

8. A method of claim 7, wherein a rendering of the at least one coach model at the least one other device is based, at least in part, on one or more filters associated with the at least one other device.

9. A method of claim 8, wherein the rendering of the at least one coach model uses, at least in part, a mixed reality user interface, a virtual reality user interface, or a combination thereof based at least in part on one or more rapport features, the one or more filters, or a combination thereof.

10. A method of claim 8, wherein the rendering of the at least one coach model uses, at least in part, a diminished reality user interface based, at least in part, on a recognition of one or more principal artifacts in a coaching environment.

11. An apparatus comprising:
    at least one processor; and
    at least one memory including computer program code for one or more programs,
    the at least one memory and the computer program code configured to, with the at least one processor, cause the apparatus to perform at least the following,
    process and/or facilitate a processing of coach multimodal sensor information to determine movement information and cognitive information, wherein the coach multimodal sensor information is captured from at least one coach device, at least one coach user of the at least one coach device, or a combination thereof while the at least one coach device, the at least one coach user, or a combination thereof is engaged in at least one activity, and
    cause, at least in part, a mapping of the movement information and the cognitive information to at least one coach model associated with the at least one activity.

12. An apparatus of claim 11, wherein the apparatus is further caused to:
    process and/or facilitate a processing of other multimodal sensor information to determine other movement information, other cognitive information, or a combination thereof, wherein the other multimodal sensor information is captured from at least one other device, at least one other user of the at least other device, or a combination thereof while the at least one other device, the at least one other user, or a combination thereof is engaged in the at least one activity, at least one similar activity, or a combination thereof.

13. An apparatus of claim 12, wherein the apparatus is further caused to:
   process and/or a facilitate a processing of the other movement information, the other cognitive information, or a combination thereof to determine proximity information with respect to the at least one coach model, and
   determine one or more media items associated with the at least one coach model to present to the at least one other device, the at least one other user, or a combination thereof based, at least in part, on the proximity information, the other movement information, the other cognitive information or a combination thereof,
   wherein the one or more media items relate, at least in part, to one or more past states, one or more current states, one or more future states, or a combination thereof of the at least one activity.

14. An apparatus of claim 13, wherein the apparatus is further caused to:
   cause, at least in part, a remixing of the at least one coach model based, at least in part, on the proximity information, the other movement information, the other cognitive information, one or more time limit parameters, one or more capabilities of the at least one other device, resource availability information, or a combination thereof.

15. An apparatus of claim 14, wherein the apparatus is further caused to:
   process and/or facilitate a processing of the at least one coach model via one or more recognition models to determine one or more sequences of the at least one coach,
   wherein the remixing of the at least one coach model is based, at least in part, on the one or more sequences.

16. An apparatus of claim 12, wherein the apparatus is further caused to:
   process and/or facilitate a processing of the proximity information, the other movement information, the other cognitive information, or a combination thereof to determine at least one rapport level between the at least one coach user and the at least one other user.

17. An apparatus of claim 16, wherein the apparatus is further caused to:
   cause, at least in part, a reconfiguration of the at least one coach model based, at least in part, on the at least one rapport level, and
   cause, at least in part, a transmission of the at least one reconfigured coach model to the at least one other device,
   wherein the reconfiguration includes, at least in part, a modification of (a) one or more coaching styles, (b) one or more media types, (c) one or more output systems, or (d) a combination thereof.

18. An apparatus of claim 17, wherein a rendering of the at least one coach model at the least one other device is based, at least in part, on one or more filters associated with the at least one other device.

19. An apparatus of claim 18, wherein the apparatus is a near eye display including, at least in part, a see-through mode, one or more mounted cameras for interaction tracking; and wherein the rendering of the at least one coach model uses, at least in part, a mixed reality user interface, a virtual reality user interface, or a combination thereof based at least in part on one or more rapport features, the one or more filters, or a combination thereof.

20. An apparatus of claim 18, wherein the rendering of the at least one coach model uses, at least in part, a diminished reality user interface based, at least in part, on a recognition of one or more principal artifacts in a coaching environment.

* * * * *